Figure 1:
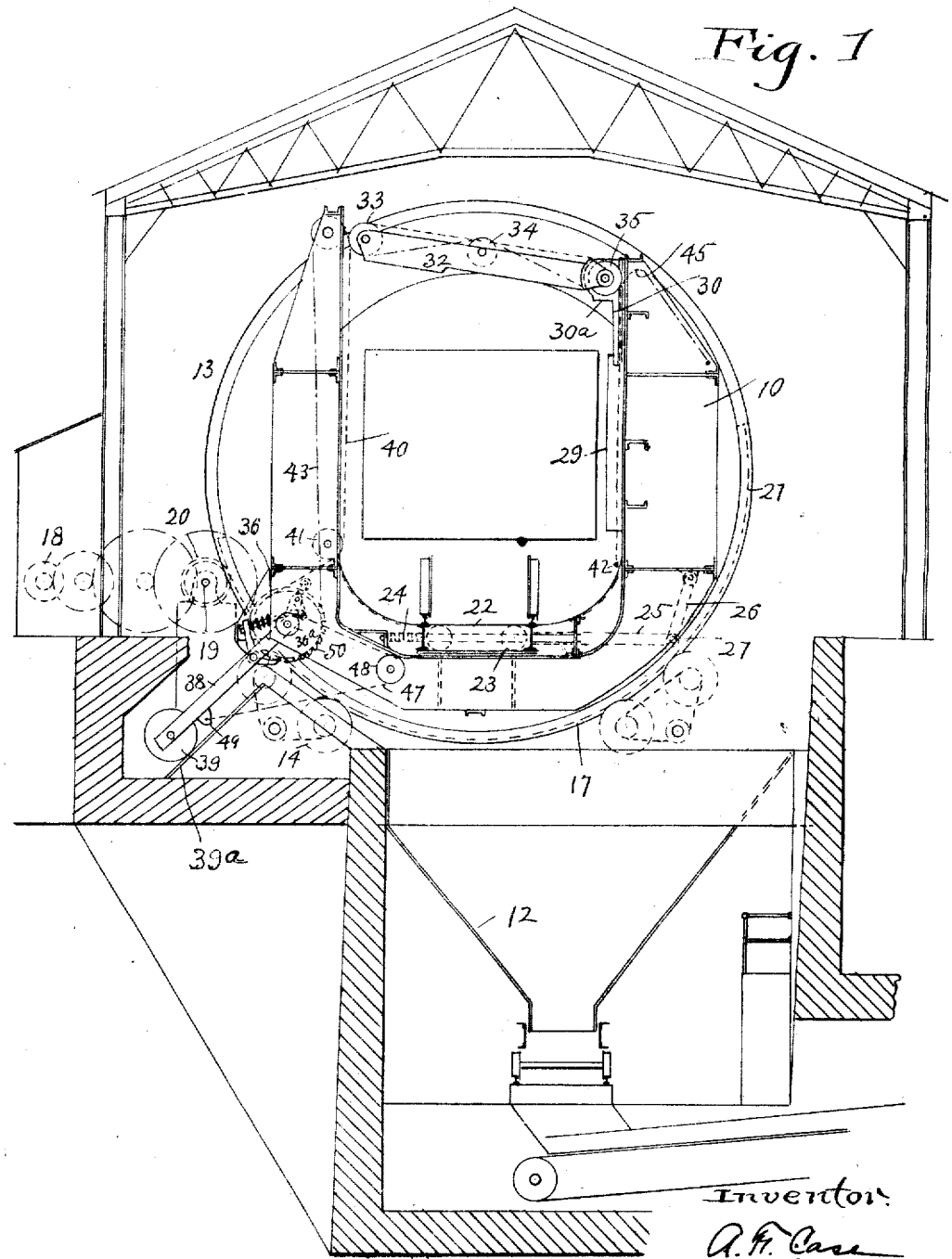

A. F. CASE.
CAR DUMPER.
APPLICATION FILED OCT. 11, 1920.

1,407,926.

Patented Feb. 28, 1922.
7 SHEETS—SHEET 1.

Inventor
A. F. Case
by Thurston Kwis & Hudson
Attys.

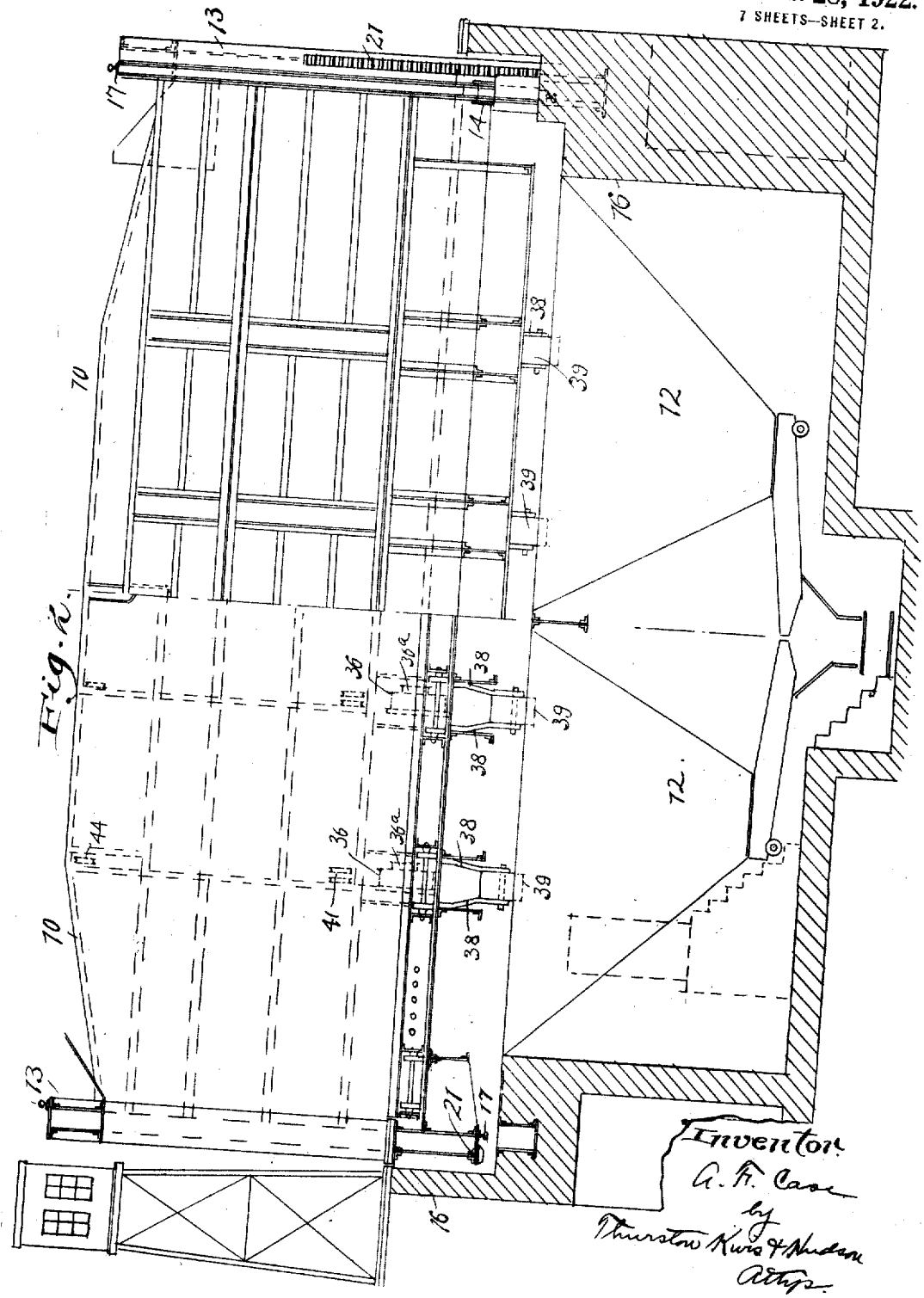

A. F. CASE.
CAR DUMPER.
APPLICATION FILED OCT. 11, 1920.
1,407,926. Patented Feb. 28, 1922.
7 SHEETS—SHEET 3.
Fig. 2ᵃ
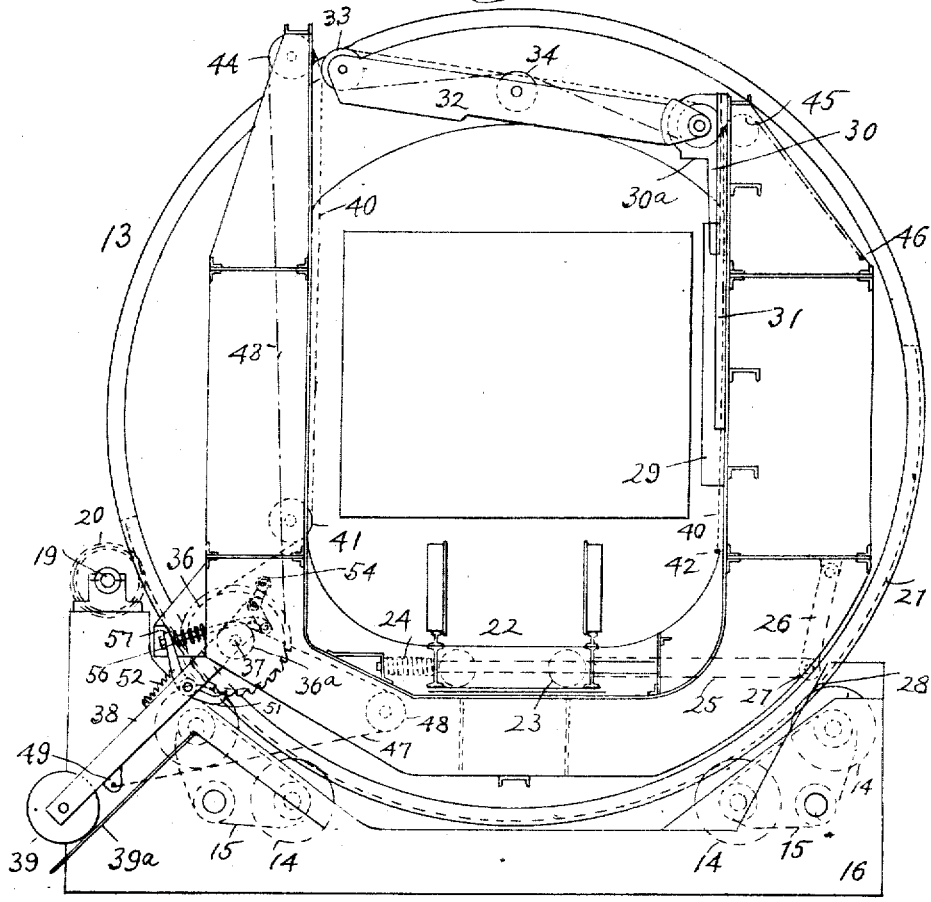
Fig. 7ᵃ
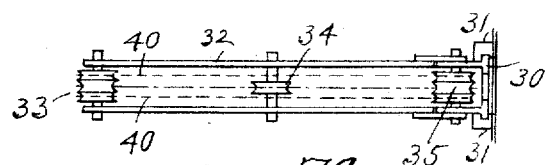
Inventor.
A. F. Case
by Thurston Kwis & Hudson
Attys

A. F. CASE.
CAR DUMPER.
APPLICATION FILED OCT. 11, 1920.

1,407,926.

Patented Feb. 28, 1922.

7 SHEETS—SHEET 4.

A. F. CASE.
CAR DUMPER.
APPLICATION FILED OCT. 11, 1920.

1,407,926.

Patented Feb. 28, 1922.
7 SHEETS—SHEET 5.

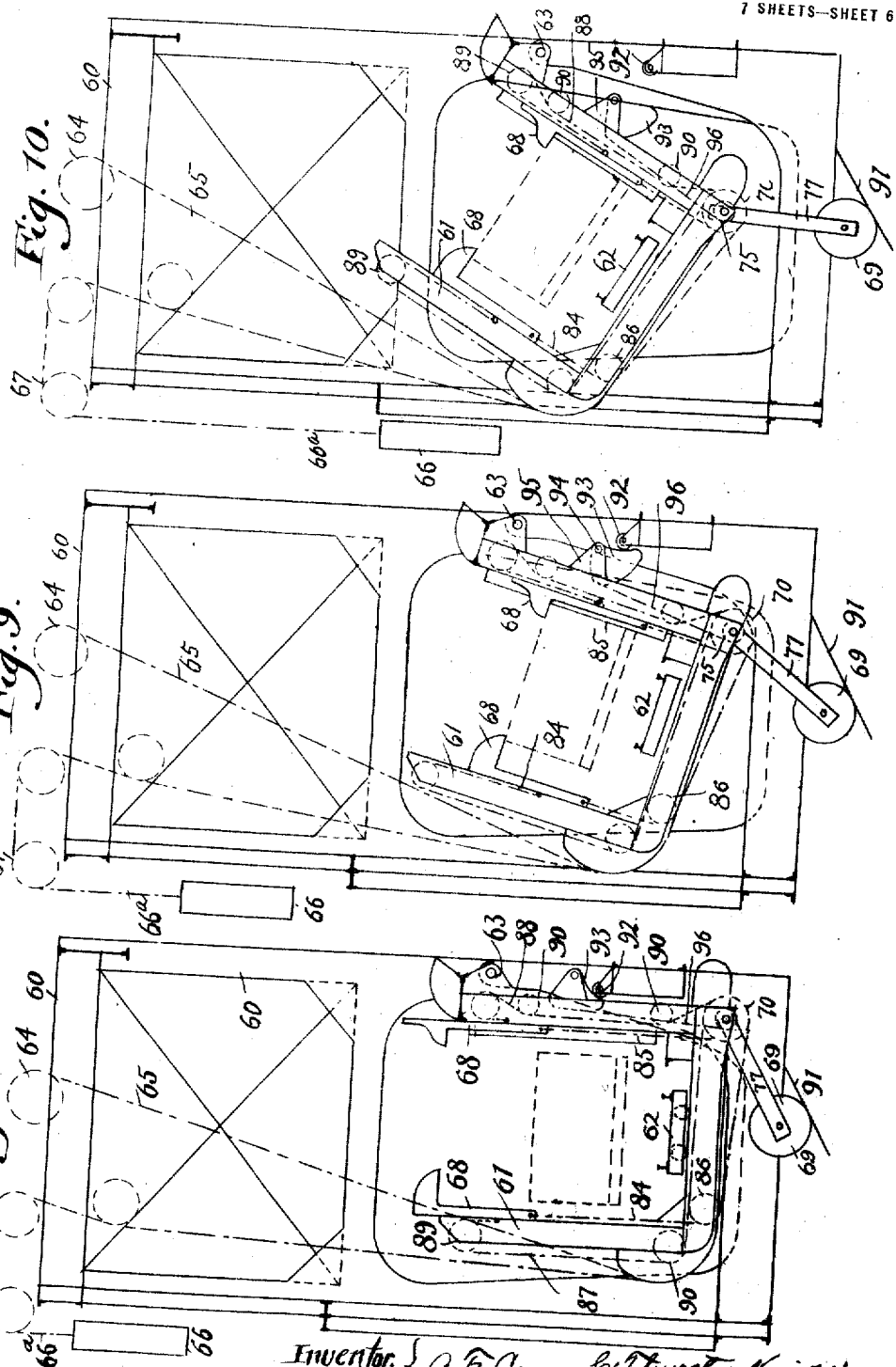

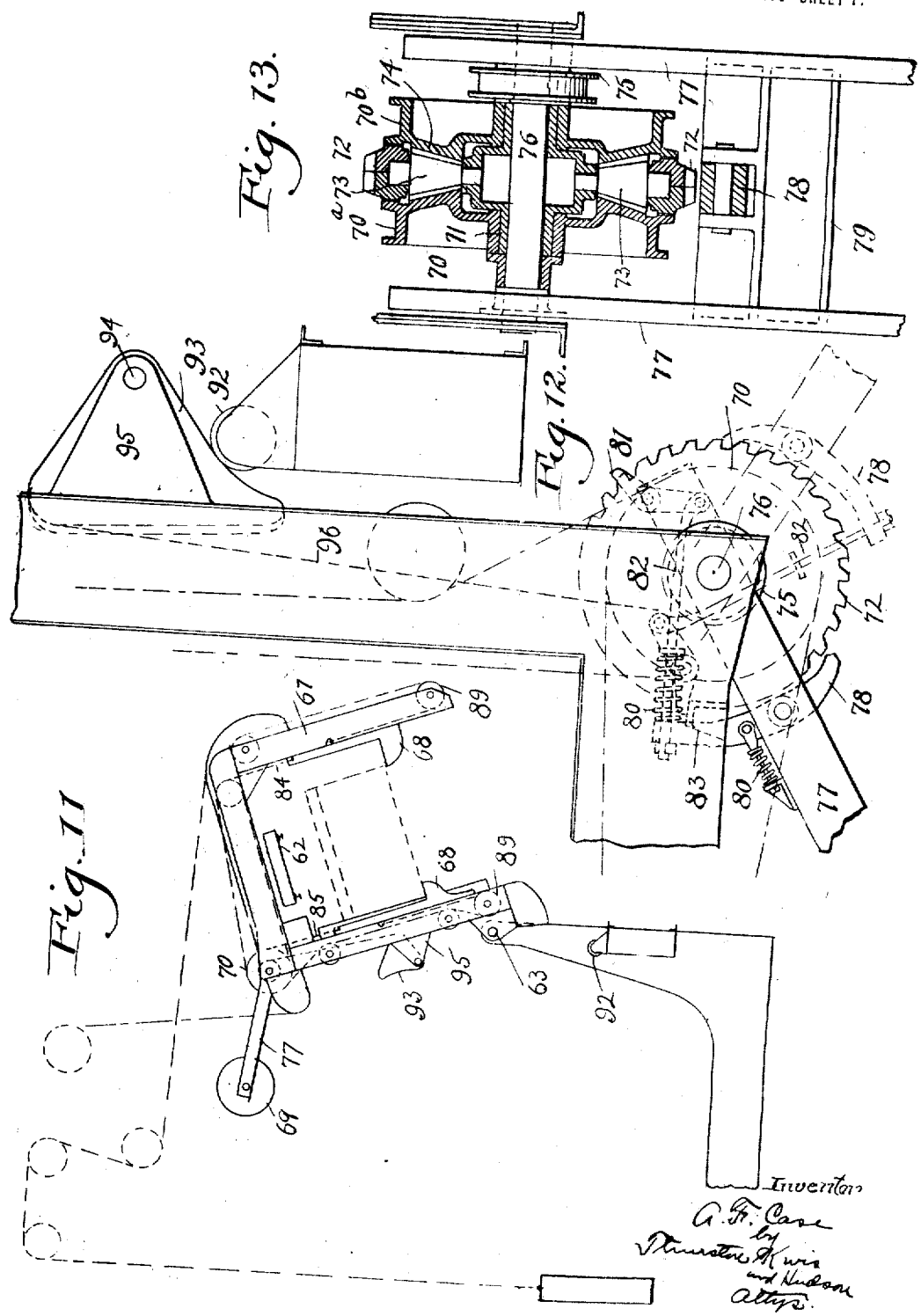

UNITED STATES PATENT OFFICE.

ARTHUR F. CASE, OF CLEVELAND, OHIO, ASSIGNOR TO THE WELLMAN-SEAVER-MORGAN COMPANY, OF CLEVELAND, OHIO, A CORPORATION OF OHIO.

CAR DUMPER.

1,407,926.

Specification of Letters Patent.   Patented Feb. 28, 1922.

Application filed October 11, 1920. Serial No. 416,105.

*To all whom it may concern:*

Be it known that I, ARTHUR F. CASE, a citizen of the United States, residing at Cleveland, in the county of Cuyahoga and State of Ohio, have invented a certain new and useful Improvement in Car Dumpers, of which the following is a full, clear, and exact description.

This invention relates to car dumpers of the type having a car receiving cradle which is turned about an axis to dump a car supported by the cradle, and the invention has particular reference to the car clamping mechanism which holds the car onto the cradle while the cradle is being turned to and from car receiving position.

The principal object of the invention is to provide a more efficient and more satisfactory clamp operating mechanism. More particularly, the invention aims to eliminate the vertically moving sectional counter weights which heretofore have been generally employed for holding the clamps onto the top of the car and to provide counterweights which are carried by the cradle and which permit the clamps to be lowered onto the top of the car at the start of the turning movement and to cause the clamps to exert a gradual increasing pressure on the car as the cradle approaches final dumping position. Further, the invention aims to provide clamp operating mechanism involving pivoted counterweights associated with drums,receiving ropes which hold the clamps down onto the top of the car after the cradle has been turned to a predetermined position from normal position and which elevate the clamps with reference to the car after the car has been dumped and just before the cradle is restored to its normal position, mechanism being provided to cause the pivoted counterweights to be automatically connected to the drums when the cradle has been turned a predetermined amount from normal position in the early part of the dumping movement and to be automatically disconnected from the drums near the end of the return movement.

The invention may be briefly summarized as consisting in certain novel details of construction, and combinations and arrangements of parts which will be described in the specification and set forth in the appended claims.

The present invention can be employed to advantage in dumpers having cradles of the cylindrical type adapted to be turned about the central axis of the cradle, cradles of this type being commonly employed in coal tipples, and it can be employed equally well in dumpers more generally employed for handling standard railway cars and having L-shaped or rectangular cradles which turn about an axis near the top of the inner straight or vertical side of the cradle, and in the drawings both types or forms of cradles are shown with my invention applied thereto.

Figure 3:
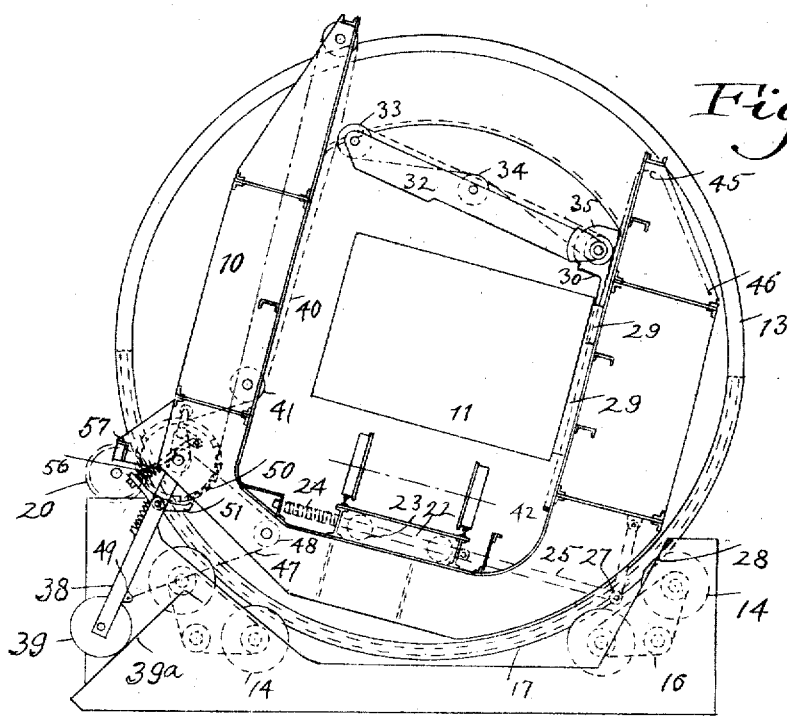
Figure 4:
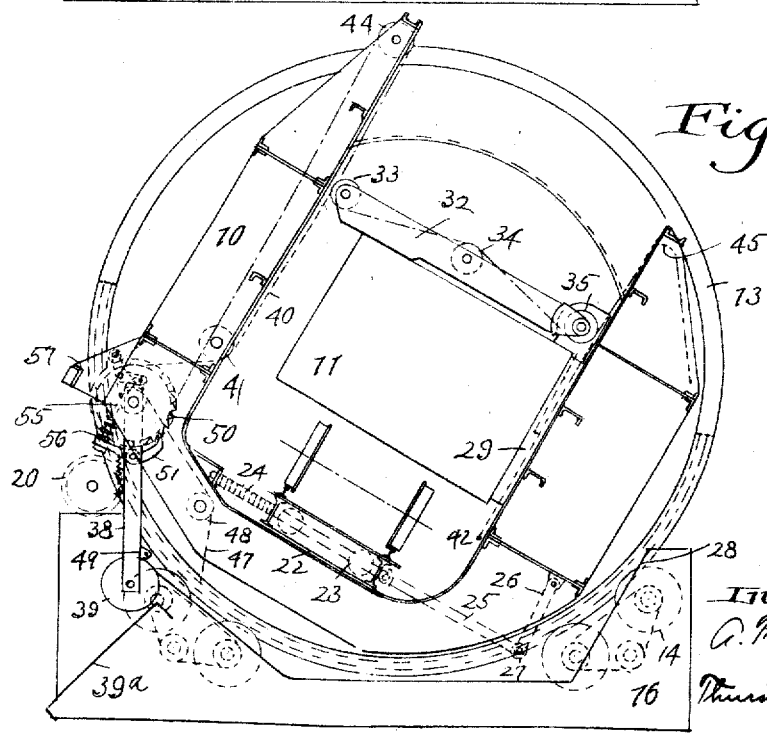
Figure 5:
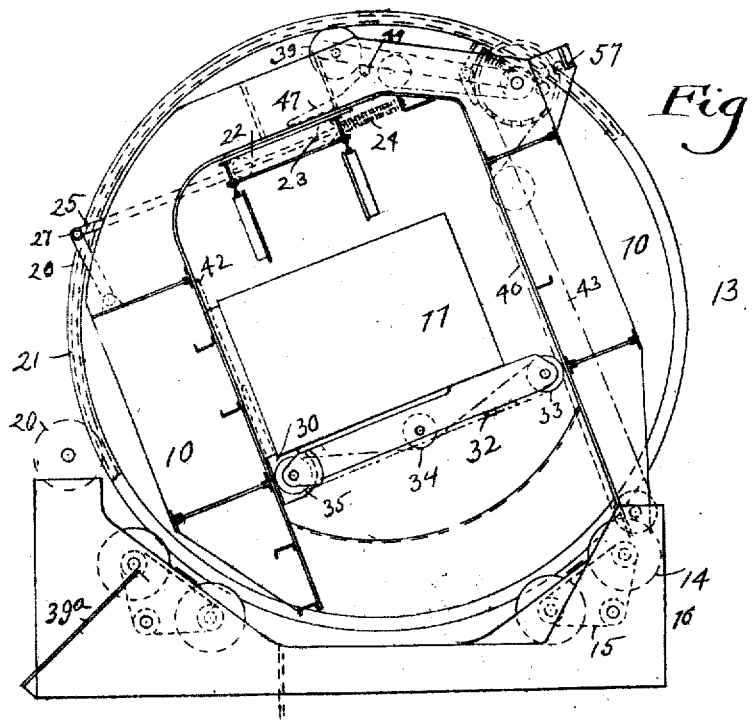
Figure 6:
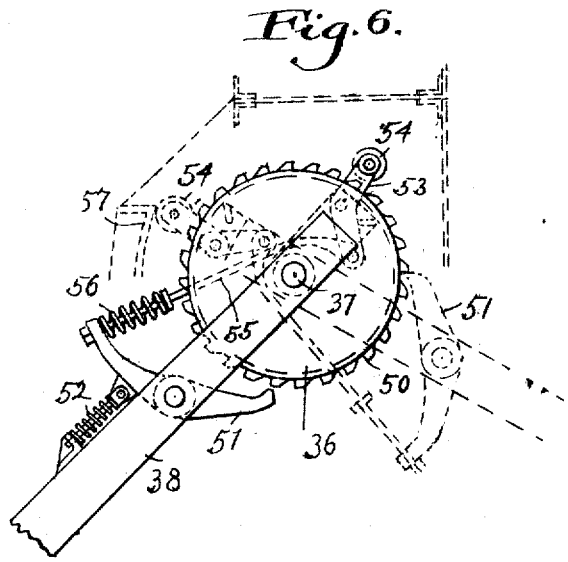
Figure 7:
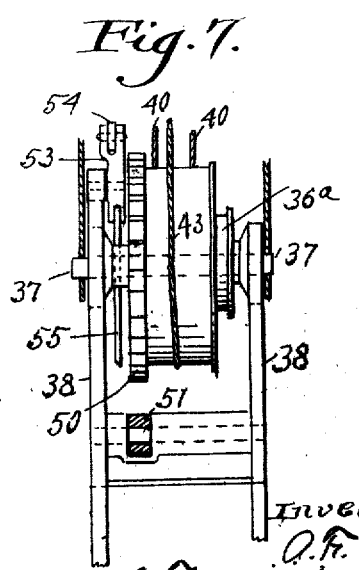

In the drawings Fig. 1 is an end view with parts in section of a dumper having a cradle of the cylindrical type; Fig. 2 is a side view of the same with substantially half the cradle in vertical section; Fig. 2ᵃ is an end view of the cradle on an enlarged scale with the cradle in the position shown in Fig. 1; Fig. 3 is a view of the cradle turned about 15° from normal position shown in Fig. 1; Fig. 4 is a similar view with the cradle turned about 30° from normal position; Fig. 5 is a similar view with the cradle turned about 160° from normal position or to its final dumping position; Fig. 6 is an enlarged view of the mechanism associated with each counterweight and drum for the purpose of forming the driving connection between the counterweight and drum and for disconnecting the two parts; Fig. 7 is a side view of the mechanism shown in Fig. 6; Fig. 7ᵃ is a longitudinal sectional view of one of the car clamps; Figs. 8 to 11 show my invention applied to a dumper having a rectangular shaped cradle, these views showing the cradle in various positions; and Figs. 12 and 13 are views corresponding to Figs. 6 and 7, showing particularly the connecting and disconnecting mechanism between the rope drums and counterweights.

Referring first to Fig. 1, the dumper shown has a cradle 10 adapted to receive a loaded railway car 11, and to be turned about its longitudinal axis through a portion of a revolution sufficient to dump the contents from the car and to permit it to drop into a suitable receptacle such as a hopper 12, the details of which do not concern the present invention.

The cradle 10 is built up of suitable structural material of any suitable design, the cradle being open at the top for the discharge of the material so that between its ends the cradle is substantially U-shaped, but at its ends it is provided with circular end frames 13 best indicated in Fig. 2. The cradle is supported at each end by two pairs of rollers 14 carried by equalizers 15 supported by the foundation 16, these rollers preferably engaging circular rails 17 wholly or partially encircling the end frames 13.

The cradle may be turned or revolved by any suitable means, but preferably by a motor 18 such as indicated at the left hand side of Fig. 1, which motor is geared to a shaft 19, the end of which is shown in Fig. 1, this shaft extending lengthwise of the cradle along one side of the same, and driving pinions, one of which is designated at 20, adapted to engage gear segments 21 carried by the end frames 13 of the cradle and extending for a suitable distance around these end frames. Any other suitable means may be provided for supporting and rotating the cradle, and as my invention does not directly concern any of these features, the above brief description considered in connection with the drawings is thought to be sufficient.

The bottom of the cradle is provided with a platen 22 having rails adapted to receive the car 11 and mounted on rollers 23 so that the platen and the car on it can be moved laterally toward one side of the cradle which may be termed the dumping side, in the well-known manner. Springs 24 may be provided to start the lateral movement of the platen and car at the start of the dumping movement and push rods 25 may be utilized to restore the platen to its normal central position at the end of the return movement. In this instance these push rods extend laterally of the platen and at their outer ends are connected by links 26 to the cradle structure. Likewise at their outer ends rollers 27 are provided which are adapted to engage inclined stops 28 so positioned that just before the cradle is restored to its normal position after dumping a car these rollers engage the inclined stops 28 and push the platen back to its central position, and at the start of the dumping movement these rollers by moving away from the inclined stops 28 permit the springs 24 to assist gravity to move the platen 22 and car 11 to the right as the structure is viewed in Fig. 1 until the side of the car rests against blocking which will be provided on the upright dumping side of the cradle.

It might be mentioned at this point that in Fig. 1 the cradle is shown in normal position and the car and platen are located centrally with respect to the cradle, and in Fig. 3 the cradle has been turned toward dumping position about 15°, and the platen has been moved laterally to the right a distance such that the right hand side of the car rests against the blocking indicated at 29.

No invention is claimed in the platen per se or in the platen moving mechanism, and further description of these parts is thought to be unnecessary.

The car clamping mechanism constituting the principal part of my invention will now be taken up and described. For the purpose of holding the car onto the platen of the cradle while the cradle is being turned to dump the car and to restore the empty car to normal position, a series of car clamps of the pivoted counterweight type are provided on the cradle, four such counterweight car clamps being contemplated with the present design, each having independent operating mechanism. In this instance each car clamp comprises a slide 30 on the dumping side of the cradle adapted to be moved up and down in guides 31 (see Fig. 7ª) bolted or otherwise suitably secured to the side of the cradle. This slide is provided with a hook or shoulder 30ª which is adapted to engage one side of the car 11 when the clamp is lowered by gravity, as will be hereinafter described. Additionally each clamp includes a beam 32 which is pivoted to the slide 30 and extends across the open upper portion of the cradle substantially to the opposite side from that which carries the slide 30. The beam is provided at its outer or free end with three sheaves 33, at the center with a sheave 34, and at the axis of the pivotal connection with the slide with three sheaves 35. It may be stated at this point that the two outer sheaves 33 and the two outer sheaves 35 accommodate a pair of holding or clamping ropes and the other sheaves accommodate a clamp lifting rope which will be explained subsequently.

The operating mechanism for each car clamp includes a drum 36 having a main portion which is adapted to accommodate two holding ropes which hold the clamp onto the car, and a clamp lifting rope, and has at one end integral or rigid with the main portion a smaller portion 36ª to accommodate a chain to be referred to. This drum is carried by the lower part of the cradle on the outer side, i. e. the side opposite to what was previously termed the dumping side, it being understood that there will be one such drum below each car clamp. This drum is mounted on a pin 37 suitably supported in the structure of the cradle, and on the outer portions of this pin and normally loose thereon are a pair of counterweight arms 38 at the outer ends of which is a car clamp counterweight 39, in this instance cylindrical in form. When the cradle is in normal position this counterweight rests upon an inclined guideway 39ª supported by the foundation or stationary part of the structure.

The two clamp holding ropes, one shown in Fig. 1 and portions of both shown in

Fig. 7, are designated 40. These ropes are secured to the drum and extend from the same on one side thereof and pass from the drum part way around a pair of deflecting sheaves 41, and from the latter extend upwardly on the inner side of the cradle around two outer sheaves 33 at the free end of the clamp beam 32, then around the two outer sheaves 55 at the inner end of the clamp beam, and then downwardly through the slide 30 along the inner face of the dumping side of the cradle to fixed anchorage points 42. The clamp lifting rope designated 43 extends from the opposite side of the drum 36, as clearly shown in Figs. 1 and 7, and from the drum it extends upwardly to near the top of the cradle around a sheave 44 at the top thereof adjacent the free end of the beam 32, then under the middle sheave 33, then over the sheave 34, under the middle sheave 35, over a sheave or other support 45 at the top of the dumping side of the cradle, and down to a fixed anchorage point 46. The reduced part 36ª of the drum is engaged by what may be termed a clamp lifting chain (or rope) 47, best indicated in Fig. 1. This chain passes from the portion 36ª of the drum around a sheave 48 at the lower part of the cradle, and from this sheave the chain passes to an ear 49 on a cross-piece connecting the counterweight arms 38. One end of the chain is fastened to the portion 36ª of the drum and the other by being fastened to this ear 49 is in effect secured to the counterweight arms 38.

Referring now particularly to Figs. 6 and 7, it will be observed that the drum is provided with ratchet teeth 50, and that the counterweight arms 38 carry a pawl 51 which is normally held out of engagement with the ratchet teeth 50 by a compression spring 52. Furthermore, at the outer end of one of the counterweight arms 38, which arm extends beyond the drum pin 37 there is a pivoted bell-crank 53 at one end of which is a roller 54, located beyond the periphery of the drum 36 and of the ratchet teeth 50. The other end of the bell-crank is connected by a link 55 to the end of the pawl 51 opposite to that which is adapted to engage the ratchet teeth 50. Preferably the link 55 is not directly connected to the pawl, but is yieldingly connected thereto through the medium of a compression spring 56 located between the pawl and an abutment on the link a short distance from the pawl.

It will be observed by reference to Fig. 6 that if the counterweight arms 38 are rotated in a counter-clockwise direction relative to the drum 36, the roller 54 will, after a predetermined relative motion in this direction, engage a cam 57 carried by the cradle and located opposite the pawl in the plane of movement thereof. The arrangement is such that when the roller 54 engages this cam the bell-crank 53 is rocked about its pivot on the counterweight arm 38, and the effect of this is to push on the link 55 and rock the pawl 51 so that its nose or ratchet end will swing into engagement with the ratchet wheel 50 or a tooth thereof and thus lock the counterweight arms and the drum, and as long as the roller 54 is in engagement with the surface of the cam 57, the counterweight arms and drum become in effect a rigid unit, so that the weight of the counterweight is transmitted to the drum through the levers afforded by the counterweight arms 38 and exerts a rotative force thereon, which as will be subsequently explained, exerts a pull on the holding ropes 40, the extent of this pull varying with the leverage or effective length of the counterweight arms, which leverage or effective length increases gradually as the cradle approaches full dumping position.

The operation of the machine is as follows: When the car 11 is run onto the platen of the cradle, the cradle, of course, is in its normal central position with the platen centrally disposed on the bottom of the cradle and with its rails in line with the rails of the approach and run-off tracks. At such time the clamps are in the position shown in Fig. 1, i. e. some distance above the top of the car and the counterweights rest on the inclined surfaces 39ª, the counterweight arms being then disconnected from the drums associated therewith.

As soon as the cradle begins to tilt, the platen and cradle move laterally toward the dumping side, and after about 15° of rotary movement the side of the car rests against the blocking on the side of the cradle, the position of the parts then being as shown in Fig. 3, the clamps still being out of engagement with the top of the car. As soon as the cradle begins to rotate the clamps begin to descend by gravity, and they continue to descend until the slides 30 engage one side of the car and the beams 32 engage the opposite side, the parts then being in the position shown in Fig. 4. The clamps descend gradually coincident with the turning movement of the cradle, the amount of rotative movement of the cradle necessary to bring the clamps to the top of the car depending upon the height of the car, but with a car of substantially the height shown in Fig. 1, the clamps will engage the car, after about 30° of rotative movement of the cradle. Up to this point, and in fact, until a certain further turning movement of the cradle, the counterweights exert no pull on the holding ropes 40.

As the clamps descend by gravity, the weight of the clamps acting through the lifting ropes 43 rotates the drum 36 in a counter-clockwise direction as the drum is viewed in Fig. 1, and this winds in the holding ropes 40, these ropes being wound up onto the drums as fast as the lifting ropes are unwound therefrom by the descent of the clamps. This movement of the drums is permitted for the reason that there is at the same time a slackening of the lifting chains 47 due to the fact that as the cradle turns from normal position in a clockwise direction as the cradle is viewed in Fig. 1, the counterweights ride up the inclined surfaces 39$^a$, and this together with the fact that the sheaves 48 are moving in an arc toward these inclined surfaces 39$^a$, results in a shortening of the distance between the sheaves 48 about which the chains 47 pass and the ears 49 to which the chains are attached. Obviously, therefore, the rotation of the drums 36 by the lifting ropes 43, due to the pull thereon by the descending clamps causes the lifting chains 47 to be wound up on the reduced portions 36$^a$ of the drums. The points to be noted are, that during the early portion of the turning movement of the cradle the car clamps descend by gravity until the slides and beams rest upon opposite sides of the car; second, during the lowering of the car clamps the counterweights 39 are not operatively connected to the drums; and third, the lowering of the clamps takes place gradually at a rate proportional to the rate of turning movement of the cradle since the rate of movement of the drums 36 while the clamps are descending is dependent upon the slackening of the lifting chains 47 and the rate at which these chains can be wound on the reduced portions of the drums, this being proportional to the rate of movement of the cradle.

As the cradle turns, the counterweights 39 ride up the inclined surfaces 39$^a$ and finally they are lifted clear of these surfaces, at which time the counterweight arms 38 extend vertically downward and the counterweights are directly beneath the axis of the drums. While this takes place there is obviously a relative movement between the counterweight arms 38 and the cams 57 (see Fig. 6) which are carried by the cradle; but when the cradle reaches a given position in its rotative movement the rollers 54 carried at the outer ends of the counterweight arms engage the cams 57, this taking place with the dumper here shown after about 55° of rotative movement from normal position, and on engagement of the rollers 54 with these cams 57, the bell-cranks 53 are rocked as already explained, pushing down on the links 55 and causing the nose of the pawls 51 carried by the counterweight arms to engage the ratchets 50 of the drums. Thereafter during the remainder of the dumping movement, i. e. until the cradle has been rocked to the position shown in Fig. 5, and during the major portion of the return movement, i. e. until the position is reached where the rollers 54 previously engaged the cams 57, the counterweights and counterweight arms are locked to the drums 36. Up to the point that the counterweight arms become locked to the drums the cradle has not been turned from normal position a sufficient distance to require any holding action by the car clamps, and therefore, any downward pull on the holding ropes 40. However, as soon as the counterweight arms become locked to the drums by the action of the pawls 51 on the ratchet portions of the drums, the counterweight arms and counterweights move with the cradle and swing out of the vertical position shown in Fig. 4, and as soon as this occurs the counterweights exert a turning effort on the drums which tends to wind in the holding ropes 40, but as these ropes are already taut, the effect of this is to exert a pull on the holding ropes, and this holds the clamps down onto the car. The degree of this rotative force exerted on the drums by the counterweights, and therefore the holding action of the holding ropes 40 on the clamps depends upon the effective leverage of the counterweight arms 38 or the displacement of these arms from the vertical position. Therefore the holding action on the clamps gradually increases as the cradle approaches dumping position and becomes a maximum when the counterweight arms reach a horizontal position which takes place near the end of the dumping movement, and as here shown, just before final or full dumping position shown in Fig. 5 is reached.

When the dumper reaches the position shown in Fig. 5, the rotation of the cradle is reversed, and toward the end of the reverse movement, or when the counterweight arms reach vertical position so that the counterweights no longer exert a rotative effect on the drums, the rollers 54 pass out of engagement with the cams 57 and the pawls 51 are rocked by the springs 52 out of engagement with the ratchet portions of the drums, that is to say, the clamping or holding action between the counterweight arms and the drums is terminated.

As the return movement is continued beyond this point, the counterweights re-engage the inclined surfaces 39$^a$ and gradually ride down the same. As this occurs, the counterweights exert a pull on the holding chains 47, and after the slack is taken out of these chains these chains begin to unwind from the reduced portions 36$^a$ of the drums and therefore rotate the drums in a clockwise direction as viewed in Fig. 1 and the other figures. Obviously the effect of this is to wind up the lifting ropes 43 and to unwind or pay out the holding ropes 40, and therefore by the action of the lifting chains 47 in rotating the drums and by the action of the latter in winding in the lifting ropes the clamps are lifted. At the end of the return movement of the cradle the clamps are again elevated to the position shown in Fig. 1, and the cycle of movement is completed, it being understood that during the last portion of the return movement, the platen 22 and the now empty car 11 are pushed back to middle position by the action of the push rods 25, due to the engagement of the rollers 27 with the inclined stops 28. The empty car can now be run off the platen and another loaded car can be pushed onto the platen, whereupon the cycle above described will be repeated.

It was previously stated that my invention can be employed advantageously also in dumpers of the well-known type wherein the cradle is designed to be swung about an axis at the upper front part of the cradle, and the adaptation of my invention to a dumper of this type is illustrated in Figs. 8 to 13. As dumpers of this type are well-known, the details of construction of the frame and cradle are not shown to any extent, but these parts are illustrated largely in conventional manner. This type of dumper has a suitable frame 60 and a cradle 61 which in this instance is U-shaped and is provided with the usual laterally movable platen 62, on which the car is adapted to be run. Any of the well-known devices may be employed for shifting the platen laterally to cause the car to be moved over against the blocking on the dumping side and to restore the platen to central position at the end of the return movement. The cradle is designed to be turned about an axis 63 at the upper front part of the cradle to dump the contents from a car.

The cradle is swung upwardly and outwardly by any suitable means such, for example, as the drum 64, here shown at the top of the structure 60, and operating ropes 65 which extend downwardly to and pass around the lower part of the cradle. Generally counterweights such as shown at 66 have counterweight ropes 66° which pass around suitable sheaves 67 and which extend down to the lower part of the cradle are employed to assist in turning the cradle to dumping position and back to normal position.

To hold the car on the cradle a number of sets of clamps 68 are provided, these clamps being slidingly mounted to move up and down on opposite sides of the cradle and adapted to engage opposite sides of the car. Only one set of clamps is shown in the drawings, it being understood that there will be a number of such sets similar to that shown and similarly operated.

A clamp operating mechanism is provided for each set of clamps similar in principle to that already described, this mechanism being located at the lower front part of the cradle, the mechanism for each set including a counterweight 69, a double drum 70 composed of two component parts 70° and 70° constituting parts of the well-known differential mechanism, most clearly shown in Fig. 13, these drums 70° and 70° being journaled on an inner sleeve 71 carrying an outer sprocket ring 72, and radially disposed bevel pinions 73 which engage bevel toothed portions 74 of the two drums 70° and 70°. Keyed on one end of the inner sleeve 71 is a chain wheel 75 which corresponds to the reduced part 36° of the drum of the first described construction. The inner sleeve is journaled on a pin 76 mounted in the cradle structure, and mounted on the outer portions of this pin are counterweight arms 77, corresponding to the counterweight arms 38 of the construction first described.

As in the first instance, the counterweight arms normally are not operatively connected to the drums but operative connection is adapted to be established when the cradle reaches a given position by mechanism similar to that first described, and including a pawl 78 carried by a cross-piece 79 connecting the counterweight arms 77, and normally held out of engagement with the ratchet ring 72 by a spring 80. A bell-crank 81 positioned at the outer end of one of the counterweight arms 77 is connected by a link 82 to the pawl as in the first instance, and a stop 83 corresponding to the cam 57 of the first construction is provided on the cradle structure in a position such that after a predetermined rotation of the cradle from normal position, the stop engages the outer end of the bell-crank 81 and rocks the pawl so that its nose engages the ratchet ring 72, so that the counterweight will exert a rotative effort on the center part of the drum structure, and therefore on the two drums 70° and 70° through the action of the bevel gearing. A pair of holding ropes 84 and 85 are attached to the lower portions of the clamps 68 and extend downwardly therefrom, one onto the drum 70° and the other onto the drum 70°, one of the ropes 84 being here shown passing around a deflecting sheave 86. Likewise clamp lifting ropes 87 and 88 are attached to the car clamps 68 and from the latter pass upwardly around sheaves 89 near the top of the cradle and then downwardly around suitable deflecting sheaves 90 positioned wherever desirable, and pass one around the drum 70° and the other around the drum 70°, but the lifting ropes as in the first instance pass in the opposite direction around their respective drums to that in which the holding ropes pass. The lifting and holding ropes have their inner ends connected to the drums as in the first construction, so that when the drums are rotated in one direction the holding ropes will be wound in and the lifting ropes paid out, and when the drums are rotated in the reverse direction the lifting ropes will be wound in and the holding ropes paid out.

It will be observed by reference to Fig. 8 that the counterweight 69 rests on an inclined support 91 on the stationary part of the dumper, but this inclined support is not for the purpose of causing the counterweight to turn the drums so as to actuate the lifting ropes as in the first instance, but simply for the purpose of elevating the counterweight when the cradle is in normal position so as to prevent it hanging down too far and interfering with mechanism beneath the cradle. However, for the purpose of actuating the lifting ropes when the cradle approaches normal position I depart somewhat from the construction first described and I provide for this purpose on the front part of the dumper structure 60 a roller 92 which is so positioned that just as the cradle approaches normal position on the return movement after dumping movement, it engages and rocks a clamp raising cam 93 pivoted at 94 to a bracket 95, on the front part of the cradle. The edge or peripheral portion of the clamp raising cam 93 is grooved to accommodate a clamp lifting chain (or rope) 96, which extends downward to and passes around the chain wheel 75 which as already stated is keyed to the inner sleeve 71 of the drum structure, the construction being such that just as the cradle approaches normal position the cam 93 is rocked by its engagement with the roller 92. This pulls up on the lifting chain 96 causing the rotation of the drums 70ᵃ and 70ᵇ and winding in the lifting ropes 87 and 88 and paying out the holding ropes 84 and 85 so as to cause the car clamps to be lifted to the position shown in Fig. 1.

Referring now to the two-part drum and the differential mechanism employed, this construction is provided in place of a single or unitary drum as shown in Fig. 7, for the reason that the clamps of each set are independent of each other, and the mechanism shown in Fig. 13 permits a slight relative movement between the drums 70ᵃ and 70ᵇ to cause both clamps to be pulled down firmly against opposite sides of the car.

In brief, the operation is as follows: When the cradle starts to tilt, the car and platen first move laterally to the blocking on the dumping side, and as this occurs the cam member 93 moves away from the roller 92 and the car clamps are then permitted to descend by gravity until they engage opposite sides of the car, this being permitted by the slackening of the lifting chain 96 which is connected to the cam 93 and to the chain wheel 75. When the cradle has been swung to a predetermined position the outer end of the bell-crank 81 carried by one of the counterweight arms engages the stop 83 carried by the cradle, and the pawl 78 is thereby rocked into engagement with the ratchet ring 72 which thereby locks the counterweight and counterweight arm to the ratchet ring 72. Thereupon the counterweight imposes rotative effort upon the two drums 70ᵃ and 70ᵇ which can move relatively through the turning of the bevel pinion 79 until equal tension is on the holding ropes. The counterweight therefore exerts a pull on the holding ropes which effectively holds the car clamps to the top of the car, and the pressure of the clamps on the car gradually increases as the effective leverage of the counterweight arms increases until the cradle reaches substantially full dumping position shown in Fig. 11. It should be noted in passing that the counterweight has a counterbalancing effect on the cradle and assists the main counterweights 65 in restoring the cradle to normal position.

On the return movement the operation is reversed, the counterweight pawl 78 being released from the ratchet ring when the cradle is returned to a point such that the counterweight arms are vertical, this being about 55° or 60° from normal position, and just before the cradle reaches normal position the cam 93 engages the roller 92 and this exerts a pull on the lifting chain 96 which rotates the drum so as to wind in the lifting ropes 87 and 88 and elevates the clamps.

Having described my invention, I claim:

1. In a car dumper, a cradle adapted to receive a car, means for turning the cradle, movable car clamps on the cradle, clamp counterweights carried by the cradle, and means for causing the counterweights to exert a holding action on the clamps after the cradle has been turned a predetermined amount from normal position.

2. In a car dumper, a cradle adapted to receive a car, means for turning the cradle, movable car clamps on the cradle, clamp counterweights carried by the cradle, and mechanism by which the clamps are permitted to be lowered onto the car through the action of gravity at the beginning of the turning movement of the cradle and after a predetermined movement of the cradle are operatively connected to the counterweights.

3. In a car dumper, a cradle adapted to receive a car, means for turning the cradle, movable car clamps and clamp counterweights carried by the cradle, the counterweights being pivotally mounted and being disconnected from the clamps until the cradle has turned a predetermined amount from normal position.

4. In a car dumper, a cradle adapted to receive a car, means for turning the cradle, movable car clamps and clamp counterweights carried by the cradle, the counterweights being pivotally mounted and being disconnected from the clamps until the cradle has turned a predetermined amount from normal position, and mechanism for connecting the counterweights and clamps and later disconnecting them.

5. In a car dumper, a cradle adapted to receive a car, means for turning the cradle, a movable car clamp, a revoluble drum carried by the cradle having a rope connected to the clamp, and a counterweight for exerting a turning effort on the drum.

6. In a car dumper, a cradle adapted to receive a car and to be turned to dump the car, a car clamp carried by the cradle, a drum also carried by the cradle and having holding and lifting ropes connected to the clamp, and a counterweight for exerting a turning effort on the drum.

7. In a car dumper, a cradle adapted to receive a car and to be turned to dump the car, a car clamp carried by the cradle, a drum also carried by the cradle and having a rope connection with the clamp, a counterweight for exerting a turning effort on the drum, and means for connecting and disconnecting the counterweight and drum.

8. In a car dumper, a cradle adapted to receive a car and to be turned to dump the car, a car clamp carried by the cradle, a drum also carried by the cradle and having holding and lifting ropes connected to the clamp, a counterweight carried by the cradle, and mechanism for causing the counterweight to exert a turning effort on the drum when the cradle has been turned a predetermined amount.

9. In a car dumper, a cradle adapted to receive a car and to be turned to dump the car, a car clamp carried by the cradle, a drum also carried by the cradle and having holding and lifting ropes connected to the clamp, a counterweight for exerting a turning effort on the drum, and mechanism by which during a portion of the turning movement of the cradle from and to normal position the counterweight is caused to exert a turning effort on the drum.

10. In a car dumper, a cradle adapted to receive a car and to be turned to dump the same, a movable car clamp and a drum carried by the cradle, the drum having rope connections with the clamp, a counterweight supported at the axis of the drum, and means for connecting and disconnecting the drum and counterweight.

11. In a car dumper, a cradle adapted to receive a car and to be turned to dump the same, a movable car clamp and a drum carried by the cradle, the drum having rope connections with the clamp, a counterweight supported at the axis of the drum, and means automatically acting while the cradle is being turned, to connect the counterweight to the drum after a predetermined movement of the cradle from normal position, and for disconnecting the counterweight from the drum when the cradle reaches a predetermined position on its return movement.

12. In a car dumper, a cradle adapted to receive a car and to be turned to dump the same, a car clamp carried by the cradle, a holding rope connected to the clamp for holding the same down against the top of the car, and a counterweight carried by the cradle for exerting a pull on the holding rope.

13. In a car dumper, a cradle adapted to receive a car and to be turned to dump the same, a car clamp carried by the cradle, a holding rope connected to the clamp for holding the same down against the top of the car, a counterweight carried by the cradle for exerting a pull on the holding rope, and means for elevating the clamp.

14. In a car dumper, a cradle adapted to receive a car and to be turned to dump the same, car clamps carried by the cradle, holding and lifting ropes connected to the clamps, and counterweights carried by the cradle for exerting a pull on the holding ropes.

15. In a car dumper, a cradle adapted to receive a car and to be turned to dump the same, car clamps carried by the cradle, drums carried by the cradle and provided with holding and lifting ropes connected to the clamps and adapted when turned in one direction to wind in the holding ropes and when turned in the opposite direction to wind in the lifting ropes.

16. In a car dumper, a cradle adapted to receive a car and to be turned to dump the same, car clamps carried by the cradle, drums carried by the cradle and provided with holding and lifting ropes connected to the clamps and adapted when turned in one direction to wind in the holding ropes and when turned in the opposite direction to wind in the lifting ropes, and means for rotating the drums in opposite directions.

17. In a car dumper, a cradle adapted to receive a car and to be turned to dump the same, car clamps carried by the cradle, drums carried by the cradle and provided with holding and lifting ropes connected to the clamps and adapted when turned in one direction to wind in the holding ropes and when turned in the opposite direction to wind in the lifting ropes, and counterweights adapted to exert a turning force on the drums.

In testimony whereof, I hereunto affix my signature.

ARTHUR F. CASE.